(12) United States Patent
Zhou et al.

(10) Patent No.: US 11,143,902 B2
(45) Date of Patent: Oct. 12, 2021

(54) TOTAL-REFLECTION INFRARED REFLECTION DEVICE AND PREPARATION METHOD THEREOF

(71) Applicants: South China Normal University, Guangdong (CN); Shenzhen Guohua Optoelectronics Co., Ltd., Guangdong (CN); G.H.S ADVANCED EQUIPMENT TECHNOLOGY CO., LTD., Guangdong (CN)

(72) Inventors: Guofu Zhou, Guangdong (CN); Xiaowen Hu, Guangdong (CN); Nan Li, Guangdong (CN)

(73) Assignees: SOUTH CHINA NORMAL UNIVERSITY, Guangdong (CN); SHENZHEN GUOHUA OPTOELECTRONICS CO., LTD., Guangdong (CN); G.H.S ADVANCED EQUIPMENT TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/491,490

(22) PCT Filed: Nov. 15, 2017

(86) PCT No.: PCT/CN2017/110992
§ 371 (c)(1),
(2) Date: Sep. 5, 2019

(87) PCT Pub. No.: WO2019/015181
PCT Pub. Date: Jan. 24, 2019

(65) Prior Publication Data
US 2020/0041827 A1    Feb. 6, 2020

(30) Foreign Application Priority Data
Jul. 21, 2017   (CN) .......................... 201710605685.6

(51) Int. Cl.
*G02F 1/1334*  (2006.01)
*G02F 1/137*  (2006.01)

(52) U.S. Cl.
CPC ........ G02F 1/1334 (2013.01); G02F 1/13718 (2013.01); *G02F 1/13345* (2021.01)

(58) Field of Classification Search
None
See application file for complete search history.

(56) References Cited

U.S. PATENT DOCUMENTS 5,384,067 A     1/1995  Doane et al.
6,894,743 B1 *  5/2005  Takatori ............ G02F 1/133553
                                                    349/106

(Continued)

FOREIGN PATENT DOCUMENTS

CN    102804003    11/2012
CN    105676489    6/2016

(Continued)

OTHER PUBLICATIONS

Espacenet English machine translation of CN106646986A (Year: 2017).*

*Primary Examiner* — Edward J Glick
*Assistant Examiner* — David Y Chung
(74) *Attorney, Agent, or Firm* — Leason Ellis LLP

(57) ABSTRACT

A total-reflection infrared reflection device and a preparation method thereof. The device includes two light-transmitting conductive substrates disposed oppositely, the two light-transmitting conductive substrates are packaged to form a seal cavity, in the seal cavity, opposite surfaces of the two light-transmitting conductive substrates are respectively coated with a first liquid crystal layer capable of reflecting left-handed polarized light and a second liquid crystal layer capable of reflecting right-handed polarized light, the first liquid crystal layer includes a polymer network and a (Continued)

cholesteric liquid crystal with a left-handed spiral structure, the second liquid crystal layer includes a polymer network and a cholesteric liquid crystal with a right-handed spiral structure, the cholesteric liquid crystal with the left-handed spiral structure can reflect left-handed polarized light, and the cholesteric liquid crystal with the right-handed spiral structure can reflect right-handed polarized light.

15 Claims, 2 Drawing Sheets

(56) References Cited

U.S. PATENT DOCUMENTS

| | | | |
|---|---|---|---|
| 2003/0174264 A1* | 9/2003 | Stephenson | G02F 1/1334 349/88 |
| 2006/0121212 A1* | 6/2006 | Iftime | C09K 19/58 428/1.1 |
| 2012/0086904 A1 | 4/2012 | Oki et al. | |
| 2016/0103351 A1* | 4/2016 | Lavrentovich | G02F 1/13306 349/33 |
| 2018/0149919 A1* | 5/2018 | Lee | G02F 1/1334 |
| 2018/0194121 A1* | 7/2018 | Yang | B29D 11/00644 |

FOREIGN PATENT DOCUMENTS

| | | |
|---|---|---|
| CN | 106646951 | 5/2017 |
| CN | 106646986 | 5/2017 |
| CN | 107346084 | 11/2017 |
| WO | WO 9323496 | 11/1993 |
| WO | WO 2017/101817 | 6/2017 |

\* cited by examiner

TOTAL-REFLECTION INFRARED REFLECTION DEVICE AND PREPARATION METHOD THEREOF

CROSS-REFERENCE TO RELATED PATENT APPLICATIONS

This application is a U.S. National Stage Application under 35 U.S.C. § 371 of International Patent Application No. PCT/CN2017/110992, filed Nov. 15, 2017, which claims the benefit of priority under 35 U.S.C. Section 119 of Chinese Patent Application number 201710605685.6 filed Jul. 21, 2017, both of which are incorporated by reference in their entireties.

TECHNICAL FIELD

The present disclosure relates to the field of household building and living, and more particularly, to a total-reflection infrared reflection device and a preparation method thereof.

BACKGROUND

An internal environment of a building is closely related to human health, especially an internal temperature of the building has a very great impact on people, so people use an air conditioner, a heating device and other devices to adjust the internal temperature of the building to a suitable range. However, the use of these devices can increase carbon dioxide emission and can have a very adverse impact on the environment.

Therefore, a building shell technology begins to play an important role, and a large number of innovative methods such as inorganic coating are applied. However, infrared rays from sunlight can enter the room through windows, affecting the indoor environment temperature.

Therefore, people begin to pay attention to the design of windows, hoping that they can control the transmission and reflection of sunlight to achieve a comfortable indoor environment that people want. People try to use blinds, liquid crystal glass, coated glass and so on, but these measures cannot adjust the infrared ray without affecting the transmission of visible light. People find that an infrared reflector of a cholesteric liquid crystal based on a stable polymer network can adjust the transmission and reflection of infrared rays without affecting visible light. The infrared reflector is adjusted by a voltage to transmit infrared rays at a low temperature and reflect infrared rays at a high temperature. The infrared reflector can adjust the internal temperature of the building, can replace the function of a temperature adjusting device such as an air conditioner and the like to a certain extent, solves the limitation of coated glass, is beneficial to reducing carbon dioxide emission, is beneficial to protecting the environment, and can be applied to automobile glass at the same time.

The infrared rays in sunlight are divided into left-handed polarized light and right-handed polarized light, a spiral structure of the cholesteric liquid crystal is also divided into left-handed and right-handed structures. The cholesteric liquid crystal with a left-handed spiral structure can only reflect left-handed polarized light, while the cholesteric liquid crystal with a right-handed spiral structure can only reflect right-handed polarized light. Therefore, the infrared reflector of the cholesteric liquid crystal comprising only one kind of spiral structure can only reflect one kind of polarized light and cannot totally reflect left-handed polarized light and right-handed polarized light. The application of the infrared reflector is limited.

SUMMARY

The technical problem to be solved by the present disclosure is to provide a novel total-reflection infrared reflection device and a preparation method thereof.

The technical solutions adopted in the present disclosure are as follows.

A total-reflection infrared reflection device comprises two light-transmitting conductive substrates disposed oppositely, the two light-transmitting conductive substrates are packaged to form a seal cavity, in the seal cavity, opposite surfaces of the two light-transmitting conductive substrates are respectively coated with a first liquid crystal layer capable of reflecting left-handed polarized light and a second liquid crystal layer capable of reflecting right-handed polarized light, the first liquid crystal layer comprises a polymer network and a cholesteric liquid crystal with a left-handed spiral structure, the second liquid crystal layer comprises a polymer network and a cholesteric liquid crystal with a right-handed spiral structure, the polymer networks can capture impurity positive ions in the first liquid crystal layer or the second liquid crystal layer, and in an electric field, movement of the impurity positive ions drives the polymer networks to move, and the polymer networks drive the cholesteric liquid crystals to move, thus changing screw pitches of the cholesteric liquid crystals.

In some preferred embodiments, the opposite surfaces of the two light-transmitting conductive substrates are both coated with a parallel alignment layer, and the first liquid crystal layer and the second liquid crystal layer are coated on the parallel alignment layers.

In some preferred embodiments, the seal cavity is also internally provided with a spacer for controlling a height of the seal cavity.

In some preferred embodiments, thicknesses of the first liquid crystal layer and the second liquid crystal layer are 10 μm to 50 μm.

The present disclosure further provides a preparation method for the total-reflection infrared reflection device above, which comprises the following steps:

preparing or taking two light-transmitting conductive substrates;

preparing the parallel alignment layer on one surface of the two light-transmitting conductive substrates;

preparing a first liquid crystal mixture and a second liquid crystal mixture, wherein the first liquid crystal mixture comprises a negative liquid crystal, a liquid crystal monomer, a left-handed chiral dopant, a photoinitiator and a polymerization inhibitor, and the second liquid crystal mixture comprises a negative liquid crystal, a liquid crystal monomer, a right-handed chiral dopant, a photoinitiator and a polymerization inhibitor;

respectively coating the first liquid crystal mixture and the second liquid crystal mixture on the parallel alignment layers of the two light-transmitting conductive substrates, irradiating the first liquid crystal mixture and the second liquid crystal mixture by ultraviolet light, and polymerizing the liquid crystal monomer to form a polymer network;

cleaning the two light-transmitting conductive substrates, removing the left-handed chiral dopant, the right-handed chiral dopant, the photoinitiator, the polymerization inhibitor, the negative liquid crystal and the unpolymerized monomer, and drying;

oppositely disposing the surfaces of the two light-transmitting conductive substrates coated with the polymer networks, and packaging the two light-transmitting conductive substrates to form a liquid crystal box; and filling the negative liquid crystal to all liquid crystal boxes.

In some preferred embodiments, the first liquid crystal mixture and the second liquid crystal mixture are coated on the parallel alignment layers of the two light-transmitting conductive substrates by any one of scraping coating and rod coating.

In some preferred embodiments, the first liquid crystal mixture and the second liquid crystal mixture coated on the parallel alignment layers of the two light-transmitting conductive substrates have thicknesses of 10 μm to 50 μm.

In some preferred embodiments, a drying temperature is 70° C. to 90° C.

In some preferred embodiments, the two light-transmitting conductive substrates are cleaned with at least one solvent of n-hexane and n-heptane.

In some preferred embodiments, after oppositely disposing the surfaces of the two light-transmitting conductive substrates coated with the polymer networks, the method further comprises a step of disposing the spacer between the two light-transmitting conductive substrates.

The present disclosure has the beneficial effects as follow:

The present disclosure provides a total-reflection infrared reflection device and a preparation method therefore, the device comprises two light-transmitting conductive substrates disposed oppositely, the two light-transmitting conductive substrates are packaged to form the seal cavity, in the seal cavity, opposite surfaces of the two light-transmitting conductive substrates are respectively coated with the first liquid crystal layer capable of reflecting left-handed polarized light and the second liquid crystal layer capable of reflecting right-handed polarized light, the first liquid crystal layer comprises the polymer network and the cholesteric liquid crystal with the left-handed spiral structure, the second liquid crystal layer comprises the polymer network and the cholesteric liquid crystal with the right-handed spiral structure, the cholesteric liquid crystal with the left-handed spiral structure can reflect left-handed polarized light, and the cholesteric liquid crystal with the right-handed spiral structure can reflect right-handed polarized light, so that the device can realize total reflection of left-handed polarized light and right-handed polarized light in a certain wave band, the polymer networks can capture impurity positive ions in the first liquid crystal layer or the second liquid crystal layer, as long as a voltage is applied to the light-transmitting conductive substrate, the first liquid crystal layer and the second liquid crystal layer can be placed under the electric field, the impurity positive ions can move towards the light-transmitting conductive substrate connected with a negative electrode of a power supply under the electric field, the movement of the impurity positive ions drives the polymer networks to move, and the polymer networks drive the cholesteric liquid crystals to move, thus changing screw pitches of the cholesteric liquid crystals. Under a powered state, in the seal cavity, the polymer networks move towards the negative electrode because of capturing the positive ions, the cholesteric liquid crystals are dispersed in the polymer networks, and the cholesteric liquid crystals move towards the negative electrode under the drive of the polymer networks, so that the screw pitch of the liquid crystal close to the light-transmitting conductive substrate connected with the negative electrode of the power supply is reduced, the screw pitch of the liquid crystal close to the light-transmitting conductive substrate connected with a positive electrode of the power supply is increased, and the spiral structure with a certain screw pitch gradient is formed in the seal cavity as a whole. According to the following formula: $\lambda = \bar{n}P$ (1), $\lambda$ is a reflection wavelength of the cholesteric liquid crystal with the single screw pitch, $\bar{n}$ is an average birefringence of the liquid crystal, and P is the screw pitch of the spiral structure; a value of $\bar{n}$ can be calculated by the formula $$\bar{n} = \sqrt{\frac{n_e^2 + 2n_o^2}{3}}, \quad (2)$$

and in the formula (2), $n_e$ is an ordinary refractive index, and $n_o$ is an extraordinary refractive index; and according to the formula $\Delta\lambda = (n_e - n_o) \times P = \Delta n \times P$ (3), $\Delta n$ is a difference of birefringence indexes, and $\Delta\lambda$ is a bandwidth of a reflection spectrum. It can be known from the formula above that when a value of P becomes a gradient range, the reflected wavelength and the reflected bandwidth of the liquid crystal layer can also be increased, thus widening the infrared reflection bandwidth. In addition, the screw pitch of the mixed liquid crystal material can be changed by adjusting the voltage applied to the light-transmitting conductive substrate and adjusting a proportion of each component in the mixed liquid crystal material, thus adjusting the reflection waveband of an infrared reflection film to meet the requirements of light reflection and transmission.

To sum up, the present disclosure provides an infrared reflection device, which can not only realize the infrared total-reflection of a certain waveband, but also realize reflection waveband adjustment.

DETAILED DESCRIPTION

First Embodiment

Figure 1:
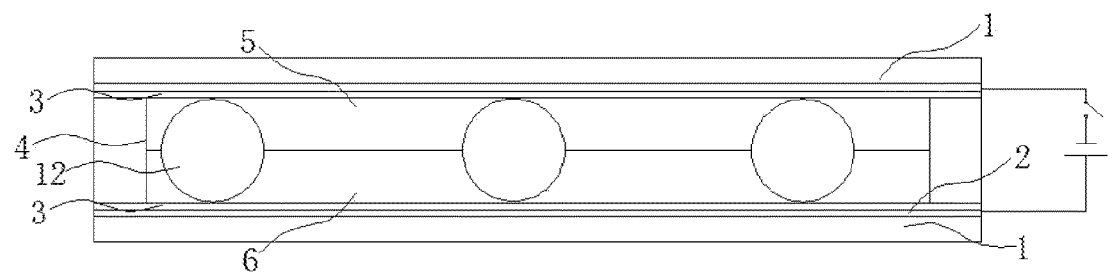
FIG. 1 is a section view of a total-reflection infrared reflection device.

A total-reflection infrared reflection device is prepared according to the following steps.

Firstly, two light-transmitting conductive substrates are prepared, and each of the light-transmitting conductive substrates comprises a substrate and a conducting layer; one surface of two light-transmitting conductive substrates are provided with parallel alignment layers;

under a yellow light condition, materials are added into a brown bottle according to a mass ratio of negative liquid crystal:liquid crystal monomer:levorotatory chiral dopant:photoinitiator:polymerization inhibitor of 81.2:12.6:5:1:0.2, wherein the negative liquid crystal is MLC-2079 of Merck Company of Germany, the liquid crystal monomer is ethylene glycol twin diacrylate of Philips Research Laboratory, the levorotatory chiral dopant is S811 of Merck Company of Germany, the photoinitiator is Irgacure-651 of TCI Company, and the polymerization inhibitor is p-hydroxy anisole, and the materials are uniformly mixed to obtain a first liquid crystal mixture;

under the yellow light condition, materials are added into a brown bottle according to a mass ratio of negative liquid crystal:liquid crystal monomer:dextral chiral dopant:photoinitiator:polymerization inhibitor of 81.2:12.6:5:1:0.2, wherein the negative liquid crystal is MLC-2079 of Merck Company of Germany, the liquid crystal monomer is ethylene glycol twin diacrylate of Philips Research Laboratory, the dextral chiral dopant is R811 of Merck Company of Germany, the photoinitiator is Irgacure-651 of TCI Company, and the polymerization inhibitor is p-hydroxy anisole, and the materials are uniformly mixed to obtain a second liquid crystal mixture;

the first liquid crystal mixture and the second liquid crystal mixture are heated to 70° C., then the first liquid crystal mixture and the second liquid crystal mixture are respectively coated on the parallel alignment layers of the two light-transmitting conductive substrates, the coating process is any one of scraping coating and rod coating, a thickness of a coating layer is 10 μm to 50 μm, after the coating is completed, a temperature is cooled to a room temperature, and the temperature is kept for 30 min, so that liquid crystal molecules are oriented; then the first liquid crystal mixture and the second liquid crystal mixture are irradiated by ultraviolet light, the liquid crystal monomer is polymerized to form the polymer network, and the selected liquid crystal monomer has an ester group capable of capturing positive icons, so that the formed polymer network also has the ester group and can also capture the positive icons;

the two light-transmitting conductive substrates are cleaned with at least one solvent of n-hexane and n-heptane, the left-handed chiral dopant, the right-handed chiral dopant, the photoinitiator, the polymerization inhibitor, the negative liquid crystal and the unpolymerized monomer are removed, and the two light-transmitting conductive substrates are dried in an oven for two hours at 70° C. to 90° C., to remove the solvent;

one surface of the two light-transmitting conductive substrates coated with the polymer networks are oppositely disposed, a spacer is disposed between the two light-transmitting conductive substrates for supporting a thickness of the device, and then the two light-transmitting conductive substrates are packaged to form a liquid crystal box by ultraviolet curing with ultraviolet glue; and the negative liquid crystal is filled into the liquid crystal box, the negative liquid crystal is MLC-2079 of Merck Company of Germany, since the polymer networks coated on the two light-transmitting conductive substrates are respectively formed under effects of the left-handed dopant and the right-handed dopant, the negative liquid crystal is filled into the liquid crystal box, the negative liquid crystal is dispersed in the polymer network, and under a joint effect of the polymer network and the parallel alignment layer, a cholesteric liquid crystal with a left-handed spiral structure and a cholesteric liquid crystal with a right-handed spiral structure are respectively formed on the surfaces of two light-transmitting conductive substrates.

A section view of the prepared total-reflection infrared reflection device is shown in FIG. 1, the total-reflection infrared reflection device comprises two light-transmitting conductive substrates oppositely disposed, each of the light-transmitting conductive substrates comprises a substrate 1 and a conducting layer 2, the opposite surfaces of the two light-transmitting conductive substrates, i.e., the conducting layers 2, are both coated with a parallel alignment layer 3, the two light-transmitting conductive substrates are packaged to form a seal cavity 4, in the seal cavity 4, the opposite surfaces of the two light-transmitting conductive substrates are respectively coated with a first liquid crystal layer 5 capable of reflecting left-handed polarized light and a second liquid crystal layer 6 capable of reflecting right-handed polarized light, and the first liquid crystal layer 5 and the second liquid crystal layer 6 are coated on the parallel alignment layers 3. Thicknesses of the first liquid crystal layer 5 and the second liquid crystal layer 6 are 10 μm to 50 μm. A spacer 12 for controlling a height of the seal cavity 4 is also disposed in the seal cavity 4.

Figure 2:
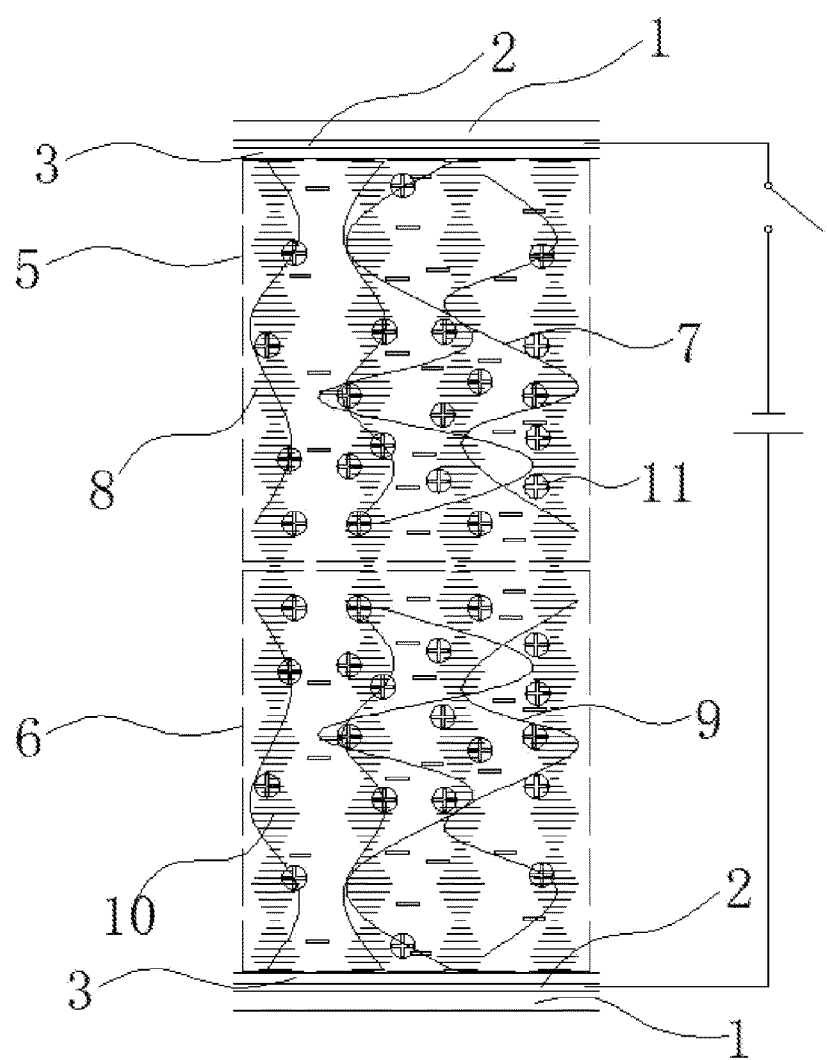
FIG. 2 is a partial section view of the total-reflection infrared reflection device in an unpowered state.

With reference to FIG. 2, FIG. 2 is a partial section view of the total-reflection infrared reflection device under an unpowered state, the first liquid crystal layer 5 comprises a polymer network 7 and a cholesteric liquid crystal 8 with a left-handed spiral structure, and the second liquid crystal layer 6 comprises a polymer network 9 and a cholesteric liquid crystal 10 with a right-handed spiral structure. The cholesteric liquid crystal 8 with the left-handed spiral structure can reflect left-handed polarized light, and the cholesteric liquid crystal 10 with the right-handed spiral structure can reflect right-handed polarized light, so that the device can realize total reflection of left-handed polarized light and right-handed polarized light in a certain wave band. The polymer networks 7 and 9 can capture impurity positive icons 11 in the first liquid crystal layer 5 or the second liquid crystal layer 6.

Figure 3:
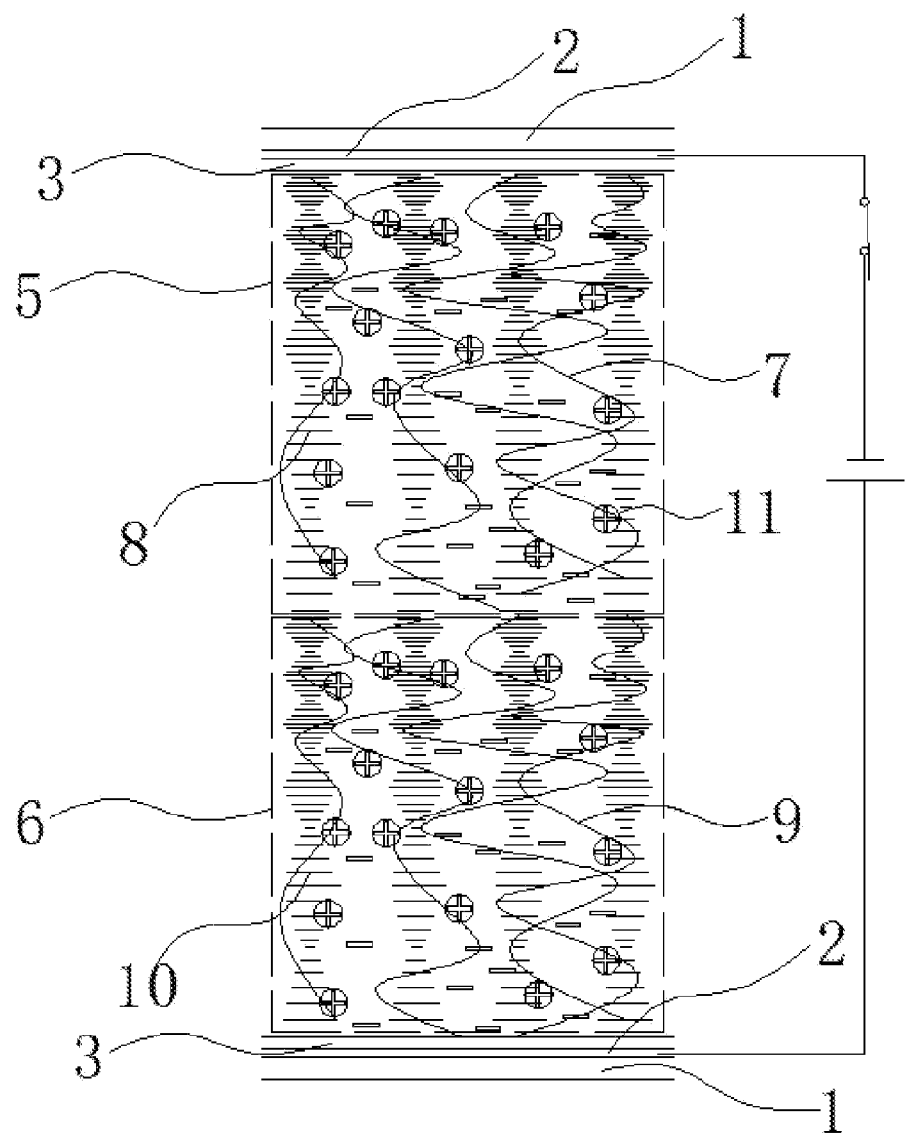
FIG. 3 is a partial section view of the total-reflection infrared reflection device in a powered state.

With reference to FIG. 3, FIG. 3 is a partial section view of the total-reflection infrared reflection device under a powered state, the polymer networks 7 and 9 can capture impurity positive icons in the first liquid crystal layer 5 or the second liquid crystal layer 6, as long as a voltage is applied to the light-transmitting conductive substrate, the first liquid crystal layer 5 and the second liquid crystal layer 6 can be placed under an electric field, the impurity positive icons 11 can move towards the light-transmitting conductive substrate connected with the negative electrode of the power supply under the electric field, movement of the impurity positive icons 11 drives the polymer networks to move, and the polymer networks 7 and 9 drive the cholesteric liquid crystals 8 and 10 to move, so that screw pitches of the cholesteric liquid crystals 8 and 10 are changed. Under a powered state, in the seal cavity, the polymer networks 7 and 9 move towards the negative electrode because of capturing the positive ions 11, the cholesteric liquid crystals 8 and 10 are dispersed in the polymer networks 7 and 9, and the cholesteric liquid crystals 8 and 10 move towards the negative electrode under the drive of the polymer networks 7 and 9, so that the screw pitch of the liquid crystal close to the light-transmitting conductive substrate connected with the negative electrode of the power supply is reduced, the screw pitch of the liquid crystal close to the light-transmitting conductive substrate connected with a positive electrode of the power supply is increased, and the spiral structure with a certain screw pitch gradient is formed in the seal cavity as a whole. According to the following formula: λ= $\bar{n}$P (1), λ is a reflection wavelength of the cholesteric liquid crystal with the single screw pitch, $\bar{n}$ is an average birefringence of the liquid crystal, and P is the screw pitch of the spiral structure; a value of n can be calculated by the formula $$\bar{n} = \sqrt{\frac{n_e^2 + 2n_o^2}{3}}, \qquad (2)$$

and in the formula (2), $n_e$ is an ordinary refractive index, and $n_o$ is an extraordinary refractive index; and according to the formula $\Delta\lambda=(n_e-n_o)\times P=\Delta n\times P$ (3), $\Delta n$ is a difference of birefringence indexes, and $\Delta\lambda$ is a bandwidth of a reflection spectrum. It can be known from the formula above that when a value of P becomes a gradient range, the reflected wavelength and the reflected bandwidth of the liquid crystal layer can also be increased, thus widening the infrared reflection bandwidth. In addition, the screw pitch of the mixed liquid crystal material can be changed by adjusting the voltage applied to the light-transmitting conductive substrate and adjusting a proportion of each component in the mixed liquid crystal material, thus adjusting the reflection waveband of an infrared reflection film to meet the requirements of light reflection and transmission. To sum up, the present disclosure provides an infrared reflection device, which can not only realize the infrared total-reflection of a certain waveband, but also realize reflection waveband adjustment.

The invention claimed is:

1. A preparation method for the total-reflection infrared reflection device, comprising:
preparing or taking two light-transmitting conductive substrates;
preparing the parallel alignment layers on one surface of the two light-transmitting conductive substrates;
preparing a first liquid crystal mixture and a second liquid crystal mixture, wherein the first liquid crystal mixture comprises a negative liquid crystal, a liquid crystal monomer, a left-handed chiral dopant, a photoinitiator and a polymerization inhibitor, and the second liquid crystal mixture comprises a negative liquid crystal, a liquid crystal monomer, a right-handed chiral dopant, a photoinitiator and a polymerization inhibitor;
heating the first liquid crystal mixture and the second liquid crystal mixture to 70° C., then respectively coating the first liquid crystal mixture and the second liquid crystal mixture on the parallel alignment layers of the two light-transmitting conductive substrates, and after the coating is completed, a temperature is cooled to a room temperature, and the temperature is kept for 30 min, irradiating the first liquid crystal mixture and the second liquid crystal mixture by ultraviolet light, and polymerizing the liquid crystal monomer to form a polymer network;
cleaning the two light-transmitting conductive substrates, removing the left-handed chiral dopant, the right-handed chiral dopant, the photoinitiator, the polymerization inhibitor, the negative liquid crystal and the unpolymerized monomer, and drying;
oppositely disposing the surfaces of the two light-transmitting conductive substrates coated with the polymer networks, and packaging the two light-transmitting conductive substrates to form a liquid crystal box; and
filling the negative liquid crystal into all liquid crystal boxes.

2. The preparation method for the total-reflection infrared reflection device of claim 1, wherein the first liquid crystal mixture and the second liquid crystal mixture are coated on the parallel alignment layers of the two light-transmitting conductive substrates by any one of scraping coating and rod coating.

3. The preparation method for the total-reflection infrared reflection device of claim 2, wherein the two light-transmitting conductive substrates are cleaned with at least one solvent of n-hexane and n-heptane.

4. The preparation method for the total-reflection infrared reflection device of claim 2, wherein after oppositely disposing the surfaces of the two light-transmitting conductive substrates coated with the polymer networks, the method further comprises a step of disposing the spacer between the two light-transmitting conductive substrates.

5. The preparation method for the total-reflection infrared reflection device of claim 1, wherein the first liquid crystal mixture and the second liquid crystal mixture coated on the parallel alignment layers of the two light-transmitting conductive substrates have a thickness of 10 μm to 50 μm.

6. The preparation method for the total-reflection infrared reflection device of claim 5, wherein the two light-transmitting conductive substrates are cleaned with at least one solvent of n-hexane and n-heptane.

7. The preparation method for the total-reflection infrared reflection device of claim 5, wherein after oppositely disposing the surfaces of the two light-transmitting conductive substrates coated with the polymer networks, the method further comprises a step of disposing the spacer between the two light-transmitting conductive substrates.

8. The preparation method for the total-reflection infrared reflection device of claim 1, wherein a drying temperature is 70° C. to 90° C.

9. The preparation method for the total-reflection infrared reflection device of claim 8, wherein after oppositely disposing the surfaces of the two light-transmitting conductive substrates coated with the polymer networks, the method further comprises a step of disposing the spacer between the two light-transmitting conductive substrates.

10. The preparation method for the total-reflection infrared reflection device of claim 1, wherein the two light-transmitting conductive substrates are cleaned with at least one solvent of n-hexane and n-heptane.

11. The preparation method for the total-reflection infrared reflection device of claim 1, wherein after oppositely disposing the surfaces of the two light-transmitting conductive substrates coated with the polymer networks, the method further comprises a step of disposing the spacer between the two light-transmitting conductive substrates.

12. A total-reflection infrared reflection device prepared by the method as claimed in claim 1, comprising:
two light-transmitting conductive substrates disposed oppositely, the two light-transmitting conductive substrates being packaged to form a seal cavity;
a first liquid crystal layer capable of reflecting left-handed polarized light and a second liquid crystal layer capable of reflecting right-handed polarized light, wherein, in the seal cavity, opposite surfaces of the two light-transmitting conductive substrates are respectively coated with the first liquid crystal layer and the second liquid crystal layer, the first liquid crystal layer comprises a polymer network and a cholesteric liquid crystal with a left-handed spiral structure, the second liquid crystal layer comprises a polymer network and a cholesteric liquid crystal with a right-handed spiral structure,
the polymer networks can capture impurity positive ions in the first liquid crystal layer or the second liquid crystal layer, and
in an electric field, movement of the impurity positive ions drives the polymer networks to move, and the polymer networks drive the cholesteric liquid crystals to move, thus changing screw pitches of the cholesteric liquid crystals.

13. The total-reflection infrared reflection device of claim 12, wherein the opposite surfaces of the two light-transmitting conductive substrates are both coated with a parallel alignment layer, and the first liquid crystal layer and the second liquid crystal layer are coated on the parallel alignment layers.

14. The total-reflection infrared reflection device of claim 12, wherein the seal cavity is also internally provided with a spacer for controlling a height of the seal cavity.

15. The total-reflection infrared reflection device of claim 12, wherein the first liquid crystal layer and the second liquid crystal layer have a thickness of 10 μm to 50 μm.

* * * * *